US011321518B2

(12) United States Patent
Banerjee et al.

(10) Patent No.: US 11,321,518 B2
(45) Date of Patent: *May 3, 2022

(54) MACHINE LEARNING BASED DOCUMENT EDITING ENGINE

(71) Applicant: SAP SE, Walldorf (DE)

(72) Inventors: Debashis Banerjee, Bengaluru (IN); Prasanna Kumar Govindappa, Bangalore (IN); David Herman, Easton, PA (US); Krishna Hindhupur Vijay Sudheendra, Bangalore (IN); Shruthi Jinadatta, Bangalore (IN); Anilkumar Tambali, Bangalore (IN); Pravinth Ganesan, Bangalore (IN); Amit Saxena, Bangalore (IN); Gaurav Rathi, Bangalore (IN); Balaji Raghunathan, Bengaluru (IN); Hari Babu Krishnan, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/200,665

(22) Filed: Mar. 12, 2021

(65) Prior Publication Data

US 2021/0200936 A1    Jul. 1, 2021

Related U.S. Application Data

(63) Continuation of application No. 15/907,237, filed on Feb. 27, 2018, now Pat. No. 10,977,429.

(51) Int. Cl.
*G06F 17/00* (2019.01)
*G06F 40/166* (2020.01)
*G06Q 10/10* (2012.01)
*G06N 3/02* (2006.01)
*G06N 20/00* (2019.01)

(52) U.S. Cl.
CPC .......... *G06F 40/166* (2020.01); *G06N 3/02* (2013.01); *G06N 20/00* (2019.01)

(58) Field of Classification Search
CPC ........ G06F 40/166; G06N 20/00; G06N 3/02; G06Q 10/10
USPC ....................................... 715/255, 200, 230
See application file for complete search history.

(56) References Cited

U.S. PATENT DOCUMENTS

| | | | |
|---|---|---|---|
| 7,475,242 B2 | 1/2009 | Baird et al. |
| 7,761,447 B2 | 7/2010 | Brill et al. |
| 9,183,259 B1 | 11/2015 | Marra et al. |
| 9,535,960 B2 | 1/2017 | Guo et al. |
| 2007/0094594 A1 | 4/2007 | Matichuk et al. |
| 2008/0306784 A1 | 12/2008 | Rajkumar et al. |
| 2011/0119576 A1 | 5/2011 | Aumann |
| 2012/0078825 A1 | 3/2012 | Kulkarni et al. |
| 2013/0073983 A1 | 3/2013 | Rasmussen et al. |

*Primary Examiner* — Manglesh M Patel
(74) *Attorney, Agent, or Firm* — Mintz Levin Cohn Ferris Glovsky and Popeo, P.C.

(57) ABSTRACT

A method for machine learning based document editing is provided. The method may include receiving, from a client, one or more inputs associated with a document. A recommendation to include and/or exclude a clause, a term, and/or a line item from the document may be generated by at least processing the one or more inputs with a machine learning model. The recommendation to include and/or exclude the clause, the term, and/or the line item from the document may be provided to the client. Related systems and articles of manufacture, including computer program products, are also provided.

20 Claims, 8 Drawing Sheets

MACHINE LEARNING BASED DOCUMENT EDITING ENGINE

This application is a continuation of U.S. patent application Ser. No. 15/907,237 filed on Feb. 27, 2018, entitled "MACHINE LEARNING BASED DOCUMENT EDITING ENGINE." The entire contents of this application is incorporated herein by reference in its entirety.

TECHNICAL FIELD

The subject matter described herein relates generally to machine learning and more specifically to machine learning based document editor.

BACKGROUND

The operations of an enterprise may give rise to a variety of electronic documents including, for example, purchase orders, sales contracts, licensing agreements, and/or the like. Each electronic document may include structured data, for example, in the form of key value pairs. The key in a key value pair may be a string value identifying a corresponding value. Meanwhile, the value in a key value may be any type of data including, for example, a string, an array, a Boolean value, a number, an object, and/or the like. An electronic document may be stored in and/or retrieved from a data repository based on the underlying structured data.

SUMMARY

Systems, methods, and articles of manufacture, including computer program products, are provided for machine learning based document editing. In one aspect, there is provided a system. The system may include at least one data processor and at least one memory. The at least one memory may store instructions that result in operations when executed by the at least one data processor. The operations may include: receiving, from a client, one or more inputs associated with a first document; generating, by at least processing the one or more inputs with a machine learning model, a recommendation to include and/or exclude a first content from the first document; and providing, to the client, the recommendation to include and/or exclude the first content from the first document.

In some variations, one or more features disclosed herein including the following features can optionally be included in any feasible combination. The one or more inputs may include an attribute associated with the first document and/or a second content included in the first document. The first content and/or the second content may include structured data.

In some variations, the machine learning model may be trained by at least processing, with the machine learning model, training data. The training data may include a first matrix storing at least one mapping between a second content of a second document and an attribute associated with the second document. The training data may further include a second matrix storing at least one mapping between the second content of the second document and an external factor. The external factor may include a current event, a market data, and/or a government regulation. The machine learning model may be trained to identify at least one correlation between the second content of the second document, the attribute of the second document, and/or the external factor.

In some variations, the machine learning model may include at least one kernel. The at least one kernel may be associated with one or more weights and biases. The at least one kernel may be configured to identify the at least one correlation by at least applying the one or more weights and biases to the first matrix and/or the second matrix. The training of the machine learning model may include adjusting the one or more weights and/or biases associated with the at least one kernel. The one or more weights and/or biases may be adjusted to at least minimize an error in the identification of the at least one correlation between the second content of the second document, the attribute of the second document, and/or the external factor. The adjustment of the one or more weights and/or biases may include a backward propagation of errors and/or gradient descent.

In some variations, the machine learning model may be a regression model, an instance-based model, a regularization model, a decision tree, a Bayesian model, a clustering model, an associative model, a neural network, a deep learning model, a dimensionality reduction model, and/or an ensemble model.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or statements or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
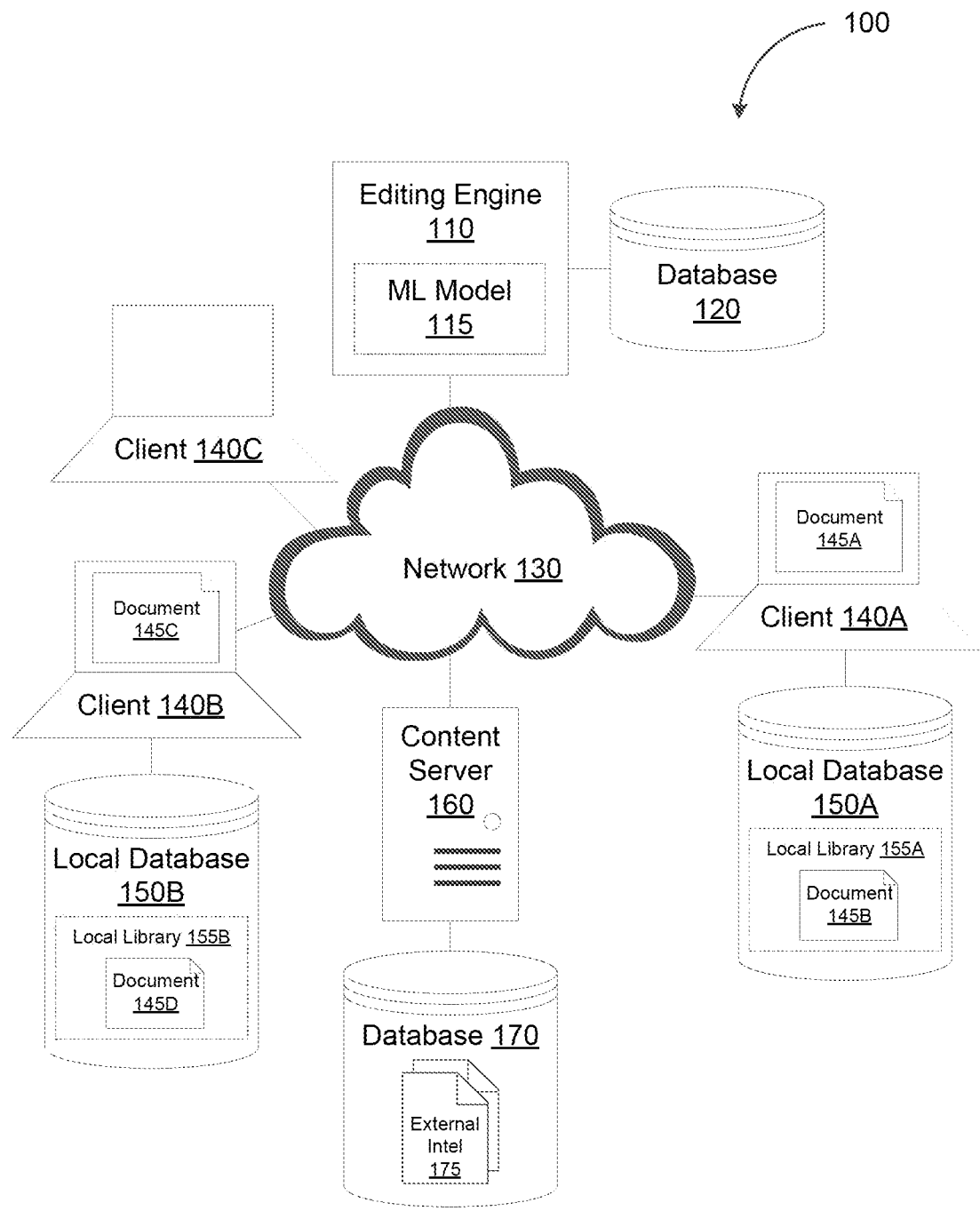
FIG. 1A depicts a system diagram illustrating a document editing system, in accordance with some example embodiments.

The operations of an enterprise may give rise to various documents that include structured data. For instance, a contract may be a type of document that includes structured data in the form of clauses, terms, and/or line items. It should be appreciated that such documents may often be subject to a retention policy. Accordingly, many enterprises may rely on document management software to manage documents throughout a multistage document lifecycle, which may include, for example, creation, execution, storage, and/or disposition. However, conventional document management software may be agnostic to the content of a document. For example, conventional document management software may allow a contract to progress through various stages of its lifecycle (e.g., creation, execution, storage, and/or disposition) even when essential clauses, terms, and/or line items are absent from the contract. As such, in some example embodiments, a document editing engine may be configured to provide recommendations regarding the content of a document. For instance, the document editing engine may recommend, during the creation of a document and/or prior to the execution of a document, the inclusion and/or exclusion of one or more clauses, terms, and/or line items from the document.

In some example embodiments, the document editing engine may include one or more machine learning models including, for example, regression models, instance-based models, regularization models, decision trees, Bayesian models, clustering models, associative models, neural networks, deep learning models, dimensionality reduction models, ensemble models, and/or the like. In order to enable the document editing engine to provide content recommendations for a document, the underlying machine learning models may be trained based on training data that includes, for example, clauses, terms, and/or line items from one or more existing documents. The content recommendations may include, for example, the inclusion and/or the exclusion of at least some of the clauses, terms, and/or line items from the existing documents. Alternatively and/or additionally, the training data may also include external intelligence including, for example, current events, market data, government rules and regulations, and/or the like. It should be appreciated that recommendations to include and/or exclude certain clauses, terms, and/or line items may also be dependent upon current events, market data, government rules and regulations, and/or the like.

In some example embodiments, document editing engine may be configured to support multitenancy such that the document editing engine may provide content recommendations to multiple tenants within a multitenant environment. It should be appreciated that the document editing engine may isolate and/or segregate data from different tenants within the multitenant environment. For example, each tenant in the multi-tenant environment may be associated with a local library. Data stored in the local library of a tenant may be inaccessible to other tenants within the multitenant environment, thereby preventing innocuous and beneficial sharing of intelligence between different tenants. As such, according to some example embodiments, the document editing engine may extract data from the local libraries of one or more tenants within the multi-tenant environment. This data may include clauses, terms, and/or line items that appear in documents associated with various tenants within the multitenant environment. The document editing engine may anonymize the extracted data, for example, by at least abstracting the data, removing personally identifiable and/or confidential information, and/or the like. Furthermore, the document editing engine may store the anonymized data in a global library, where the anonymized data may be used to generate content recommendations for any tenant within the multitenant environment.

FIG. 1A depicts a system diagram illustrating a document editing system 100, in accordance with some example embodiments. Referring to FIG. 1A, the document editing system 100 may include an editing engine 110. As shown in FIG. 1A, the editing engine 110 may include a machine learning model 115 and may be coupled with a database 120, which may be any type of database including, for example, a relational database, a non-structured query language (NoSQL) database, an in-memory database, a graph database, and/or the like. Furthermore, as FIG. 1A shows, the editing engine 110 may be communicatively coupled, via a network 130, with a server 160 and plurality of clients including, for example, a first client 140A, a second client 145B, and/or a third client 145C. It should be appreciated that the network 130 may be any wired and/or wireless network including, for example, a public land mobile network (PLMN), a wide area network (WAN), a local area network (LAN), a virtual local area network (VLAN), the Internet, and/or the like.

In some example embodiments, the editing engine 110 may be configured to provide content recommendations. For example, during the creation of a first document 145A by the first client 140A and/or prior to the execution of the first document 145A, the editing engine 110 may receive, from the first client 140A, one or more inputs for creating the first document 145A. The first document 145A may govern a specific transaction $T_1$ (e.g., sale, purchase, lease, and/or the like) with an entity $E_1$ (e.g., supplier, vendor, and/or the like) in an industry $I_1$ for a certain commodity $C_1$ (e.g., goods, service, and/or the like) in a particular region $R_1$ on a set date $D_1$. As such, the editing engine 110 may receive inputs that include one or more attributes associated with the first document 145A including, for example, may provide, to the first client 140A, one or more recommendations with respect to the content of the first document 145A. Alternatively and/or additionally, the editing engine 110 may also receive inputs corresponding to the addition and/or deletion of content (e.g., clause, term, line item, and/or the like) from the first document 145A. Where the editing engine 110 may be deployed to provide content recommendations prior to the execution of the first document 145A, the one or more inputs may include the first document 145A in its entirety. According to some example embodiments, the editing engine 110 may respond to these inputs from the first client 140A by at least providing content recommendations that include, for example, the inclusion and/or exclusion of content (e.g., clauses, terms, line items, and/or the like) from the first document 145A. These content recommendations may correspond to the inputs received from the first client 140A including, for example, the attributes associated with the first document 145A, the content of the first document 145A, and/or the like.

As used herein, a document may refer to any voluntary arrangement between two or more parties that is enforceable by law as a binding legal agreement. A clause may refer to a provision within a document that addresses one or more aspects of the document including, for example, compensation, warranty, confidentiality, dispute resolution, ethics, force majeure, governing law, choice of language, damages, indemnification, and/or the like. Meanwhile, a term may refer to the specific conditions and/or obligations set forth within a clause of a document including, for example, price, time, and/or the like. A line item may identify a specific commodity that is being transacted (e.g., sold, purchased, leased, and/or the like) under a document.

In some example embodiments, the editing engine 110 may be deployed locally and/or remotely to provide content recommendations. For example, as shown in FIG. 1A, one or more functionalities of the editing engine 110 may be available remotely, for example, as a cloud-based service, a web application, a software as a service (Saas), and/or the like. Accordingly, at least some of the functionalities of the editing engine 110 may be exposed, for example, to the first client 140A, the second client 140B, and/or the third client 140C, via an application programming interface (API) including, for example, simple object access protocol (SOAP), representational state transfer (RESTful), and/or the like. Alternatively and/or additionally, the editing engine 110 may also be deployed locally as computer software and/or dedicated circuitry (e.g., application specific integrated circuits (ASICs), field programmable gate arrays (FPGAs), and/or the like) at the first client 140A, the second client 140B, and/or the third client 140C.

Figure 2A:
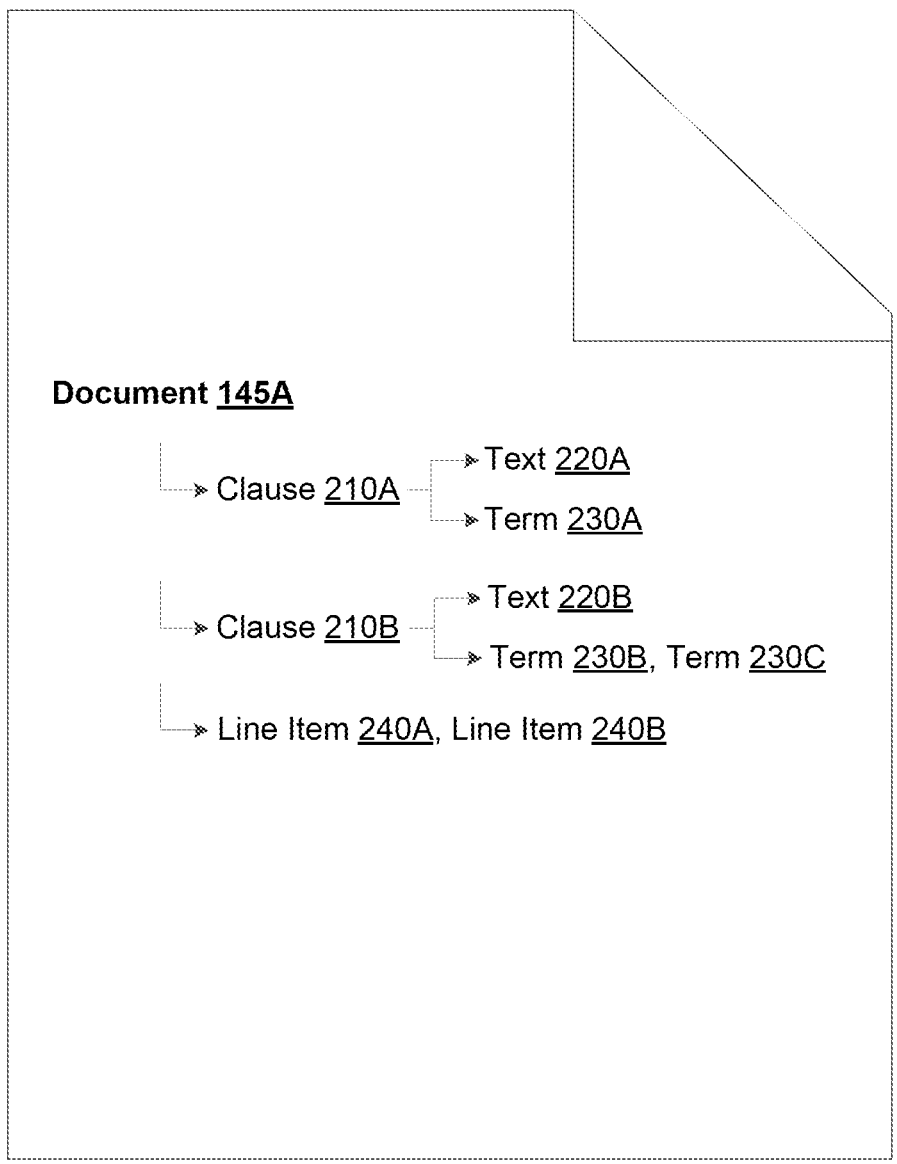
FIG. 2A depicts a structure of a document, in accordance with some example embodiments.

To further illustrate, FIG. 2A depicts a structure of the first document 145A, in accordance with some example embodiments. As shown in FIG. 2A, the first document 145A may include a plurality of clauses including, for example, a first clause 210A and a second clause 210B. The first clause 210A and/or the second clause 210B may each include text and at least one term. For example, the first clause 210A may include a first text 220A and a first term 230A. Meanwhile, the second clause 210B may include a second text 220B, a second term 230B, and a third term 230C. Alternatively and/or additionally, the first document 145A may include one or more line items including, for example, a first line item 240A and a second line item 240B. In some example embodiments, during the creation of the first document 145A and/or prior to the execution of the first document 145A, the editing engine 110 may provide one or more content recommendations including, for example, the inclusion and/or exclusion of the first clause 210A, the second clause 210B, the first term 230A, the second term 230B, the third term 230C, the first line item 240A, and/or the second line item 230B.

According to some example embodiments, the editing engine 110 may include one or more machine learning models including, for example, the machine learning model 115. As noted, the machine learning model 115 may be any type of machine learning model including, for example, a regression model, an instance-based model, a regularization model, a decision tree, a Bayesian model, a clustering model, an associative model, a neural network, a deep learning model, a dimensionality reduction model, an ensemble model, and/or the like. Moreover, the machine learning model 115 may be trained to identify one or more clauses, terms, and/or line items that may be relevant to the transaction $T_1$, the entity $E_1$, the industry $I_1$, the commodity $C_1$, the region $R_1$, and/or the date $D_1$ associated with the first document 145A. Alternatively and/or additionally, the machine learning model 115 may be trained to identify additional clauses, terms, and/or line items that may be relevant to the existing clauses, terms, and/or line items in the first document 145A.

Referring again to FIG. 1A, the training data used to train the machine learning model 115 may include one or more existing documents associated with the first client 140A including, for example, a second document 145B. In some example embodiments, the training data may include mappings between the attributes of an existing document and the content of that document. For example, the second document 145B may be associated with one or more attributes, including, for example, a transaction $T_2$, an entity $E_2$, an industry $I_2$, a commodity $C_2$, a region $R_2$, a date $D_2$, and/or the like. The second document 145B may further include and/or exclude one or more clauses including, for example, a compensation clause, a warranty clause, a confidentiality clause, a dispute resolution clause, an ethics clause, a force majeure clause, a governing law clause, a choice of language clause, a damages clause, a indemnification clause, and/or the like. As such, the training data used to train the machine learning model 115 may include mappings between the attributes associated with the second document 145B and the types of clauses that are included and/or excluded from the second document 145B. Training the machine learning model 115 using this training data may enable the machine learning model 115 to recognize correlations between the content of a document (e.g., clauses, terms, line items, and/or the like) and the attributes of the document (e.g., transaction, entity, industry, commodity, region, date, and/or the like). For instance, the machine learning model 115 may be trained to recognize, for example, that a document for the transaction $T_2$, the entity $E_2$, the industry $I_2$, the commodity $C_2$, the region $R_2$, and the date $D_2$ should include and/or exclude a compensation clause, a warranty clause, a confidentiality clause, a dispute resolution clause, an ethics clause, a force majeure clause, a governing law clause, a choice of language clause, a damages clause, and/or an indemnification clause.

Alternatively and/or additionally, the training data used to train the machine learning model 115 may further include external intelligence 175, which the editing engine 110 may retrieve from a plurality of external sources including, for example, a second database 170 coupled with a content server 160. This external intelligence 175 may include, for example, current events, market data, government rules and/or regulations, and/or the like. In some example embodiments, the training data may include mappings between the external intelligence 175 and the contents of a document. For example, the external intelligence 175 may include government rules and/or regulations that necessitate the inclusion of a warranty clause in a document. Alternatively and/or additionally, the external intelligence 175 may include market data (e.g., commodity market data, stock market data, and/or the like) that necessitates changing a pricing term and/or a time term in a document. As such, training the machine learning model 115 using training data that further includes the external intelligence 175 may enable the machine learning model 115 to recognize correlations between the content of a document (e.g., clauses, terms, line items, and/or the like), the attributes of the document (e.g., transaction, entity, industry, commodity, region, date, and/or the like), and external factors relevant to the document including for example, current events, market data, government rules and/or regulations, and/or the like.

Figure 2B:
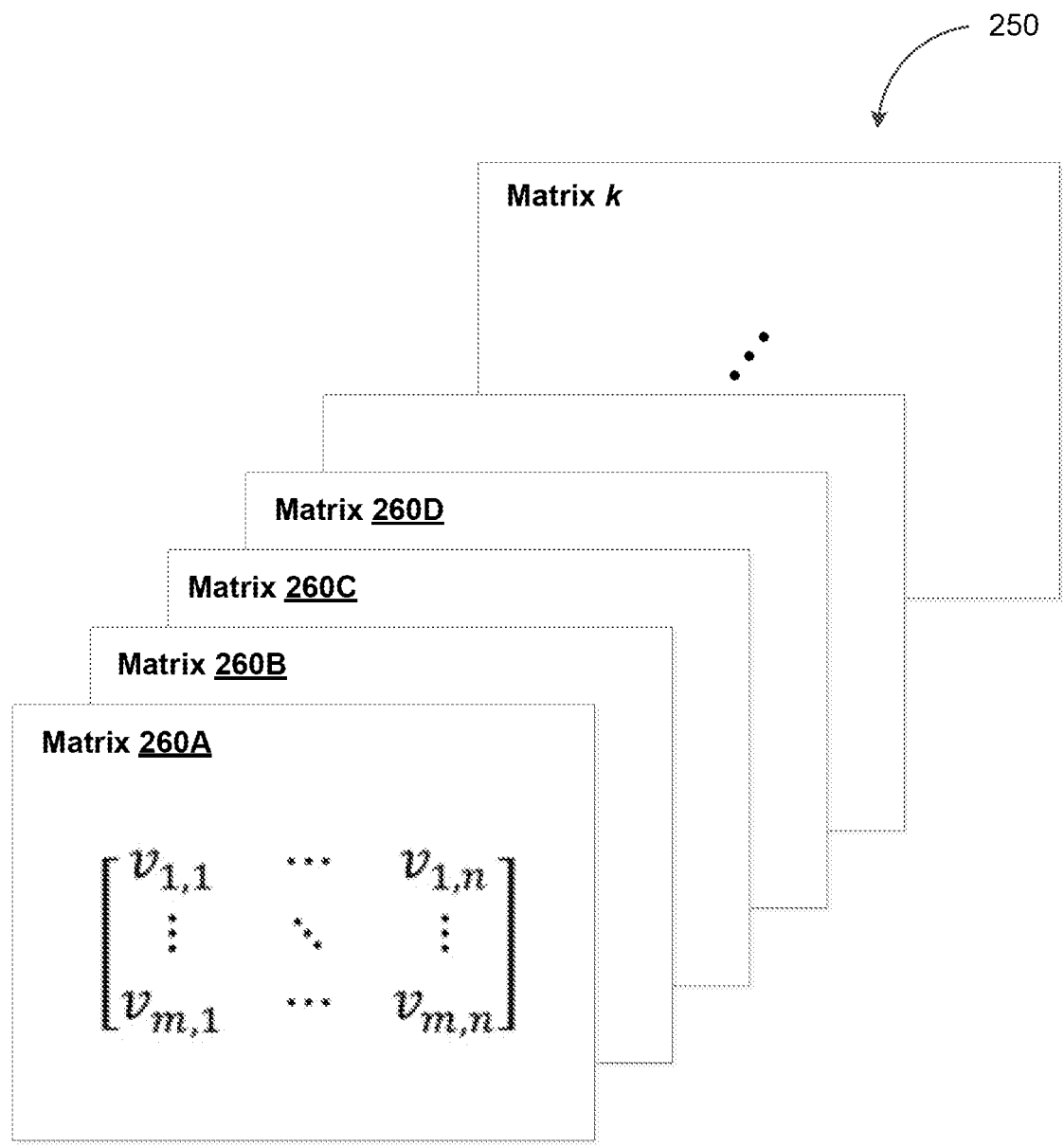
FIG. 2B depicts a training data for training machine learning model, in accordance with some example embodiments.

To further illustrate, FIG. 2B depicts training data 250 for training the machine learning model 150, in accordance with some example embodiments. Referring to FIG. 2B, the training data 250 may include a k quantity of matrices including, for example, a first matrix 260A, a second matrix 260B, a third matrix 260C, a fourth matrix 260D, and/or the like.

In some example embodiments, one or more of the k quantity of matrices included in the training data 250 may include mappings between the content of a document (e.g., a clause, a term, a line item, and/or the like) and an attribute of the document (e.g., transaction, entity, industry, commodity, region, date, and/or the like). Alternatively and/or additionally, one or more of the k quantity of matrices included in the training data 250 may include mappings between the external factors from the external intelligence 175 (e.g., current events, market data, government rules and regulations, and/or the like) and the contents of a document (e.g., a clause, a term, a line item, and/or the like). For example, the first matrix 260A may include mappings between the industry associated with a document and the clauses included in the document. Meanwhile, the second matrix 260B may include mappings between the entity associated with a document and the clauses included in the document. The third matrix 260C may include mappings between the commodity associated with a document and the clauses included in the document while the fourth matrix 260D may include mappings between external factors and the clauses included in the document. Furthermore, the fifth matrix 260 E may include mappings between the industry associated with a document and the terms included in the document.

To further illustrate, FIG. 2B shows the first matrix 260A as being an m×n matrix. Each row in the first matrix 260A may correspond to one of an m quantity of industries while each column in the first matrix 260A may correspond to one of an n quantity of clauses. Accordingly, the first matrix 260A may include an m×n quantity of mappings between the m quantity of industries and the n quantity of clauses. As shown in FIG. 2B, each element $v_{m,n}$ of the first matrix 260A may be a value (e.g., a "0" or a "1") indicating the presence and/or absence of a clause $C_n$ in a document associated with an industry $I_m$. For example, one element from the first matrix 260A may be a value (e.g., "1") indicating that a document associated with the oil and gas industry may include a force majeure clause. Meanwhile, another element from the matrix 260B may be a value (e.g., "0") indicating that a document associated with the retail industry may include warranty clause.

In some example embodiments, the machine learning model 115 may be trained based on the training data 250. As noted, the training data 250 may include a k quantity of matrices (e.g., the first matrix 260A, the second matrix 260B, the third matrix 260C, the fourth matrix 260D, and/or the like) that include mappings between the attributes of a document (e.g., transaction, entity, industry, commodity, region, date, and/or the like), one or more external factors (e.g., current events, market data, government rules and/or regulations, and/or the like), and the content of the document (e.g., clauses, terms, line items, and/or the like). Training the machine learning model 115 based on the training data 250 may enable the machine learning model 115 to recognize correlations between the attributes of the document, one or more external factors, and the content of the document.

According to some example embodiments, the machine learning model 115 may be trained to detect relationships that may exist across the different matrices included in the training data 250. For example, the machine learning model 115 may be trained to detect, amongst the mappings included in the training data 250, more complex relationships that may exist between the attributes of a document, the external factors, and the content of the document. In doing so, the editing engine 110 may utilize the trained machine learning model 115 to identify, during the creation of the first document 145A and/or prior to the execution of the first document 145A, content (e.g., clauses, terms, line items and/or the like) that should be included and/or excluded from the first document 145A given the transaction $T_1$, entity $E_1$, industry $I_1$, commodity $C_1$, region $R_1$, and/or date $D_1$ associated with the first document 145A.

For instance, the machine learning model 115 may be trained to determine that a document for the sale of a self-driving vehicle is not required to include an indemnification clause if the document already includes a warranty clause and is executed on or after Jan. 1, 2018. As such, the document editing engine 110 may provide, to the first client 140A, recommendations to exclude an indemnification clause from the first document 145A if the first document 145A is a document for the sale of a self-driving vehicle that already includes a warranty clause and is executed on or after Jan. 1, 2018.

Figure 3:
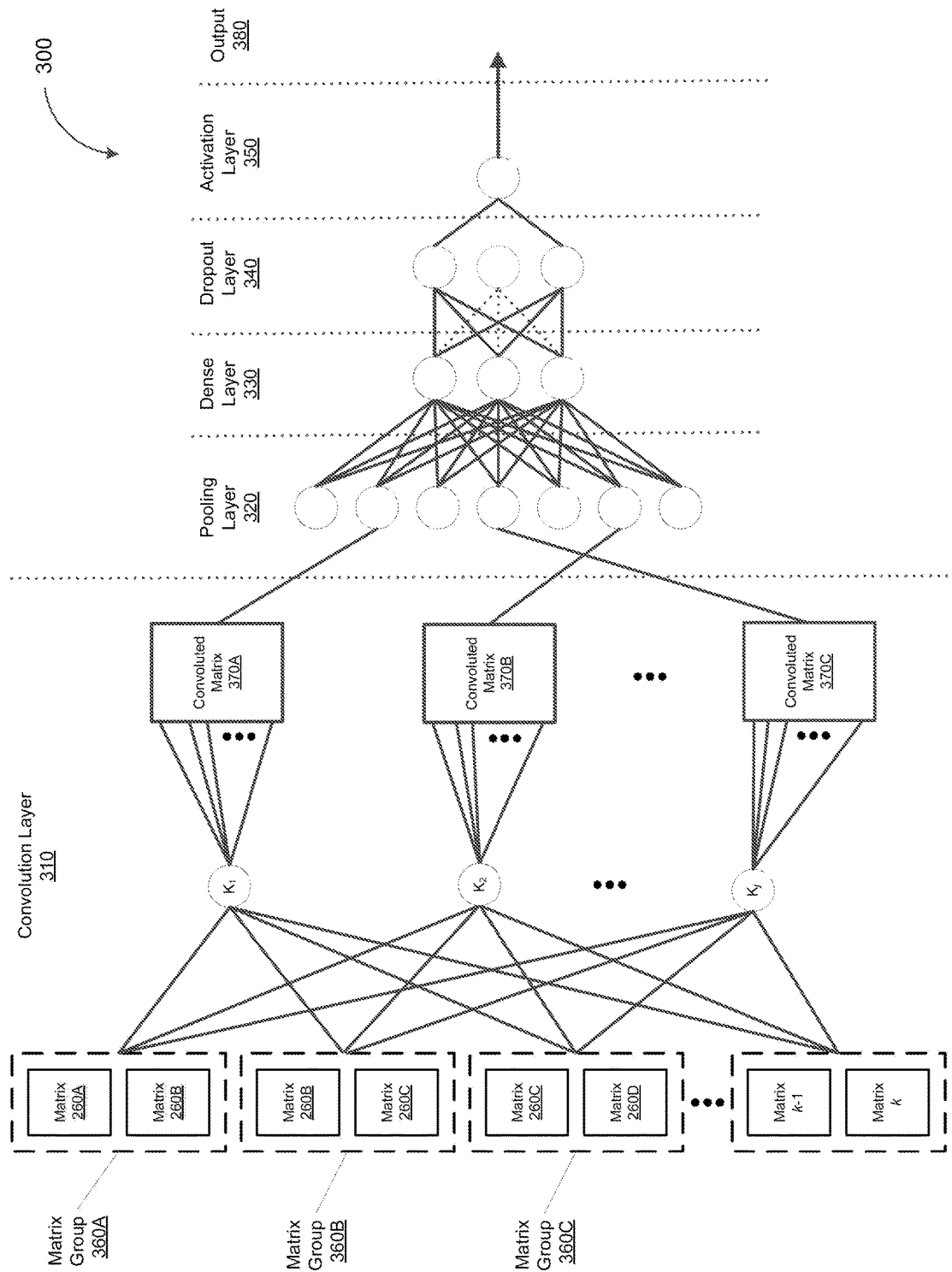
FIG. 3 depicts a flowchart illustrating a process for separating memory resources within a cache, in accordance with some example embodiments.

FIG. 3 depicts a neural network 300, in accordance with some example embodiments. Referring to FIGS. 1A and 3, the machine learning model 115 may be implemented as the neural network 300. As shown in FIG. 3, the neural network 300 may be a convolutional neural network. However, it should be appreciated that the neural network 300 may be any type of artificial neural network including, for example, an autoencoder, a probabilistic neural network, a time delay neural network, a recurrent neural network, and/or the like. Moreover, instead of and/or in addition to the neural network 300, the machine learning model 115 may also be implemented as a regression model, an instance-based model, a regularization model, a decision tree, a Bayesian model, a clustering model, an associative model, a neural network, a deep learning model, a dimensionality reduction model, an ensemble model, and/or the like.

Referring again to FIG. 3, the neural network 300 may include a plurality of layers including, for example, a convolution layer 310, a pooling layer 320, a dense layer 330, a dropout layer 340, an activation layer 350, and/or the like. It should be appreciated that the neural network 300 may include different and/or additional layers than shown.

As noted, in some example embodiments, the neural network 300 may be trained, for example, based on the training data 250, in order to provide content recommendations during the creation of the first document 145A and/or prior to the execution of the first document 145A. Referring to FIG. 2B, the training data 250 may include a k quantity of matrices including, for example, the first matrix 260A, the second matrix 260B, the third matrix 260C, the fourth matrix 260D, and/or the like. One or more of the k quantity of matrices may include values indicating mappings between the attributes of a document (e.g., transaction, entity, industry, commodity, region, date, and/or the like) and the content of the document (e.g., clauses, terms, line items, and/or the like). Alternatively and/or additionally, one or more of the k quantity of matrices may include values indicating mappings between one or more external factors (e.g., current events, market data, government rules and/or regulations, and/or the like) and the content of the document (e.g., clauses, terms, line items, and/or the like).

According to some example embodiments, each of the plurality of layers included in the neural network 300 may include one or more kernels. It should be appreciated that a kernel within a neural network may also be referred to as a neuron, a filter, and/or a feature detector. The kernels in each successive layer of the neural network 300 may be configured to detect relationships of increasing complexity. For instance, the mappings included each of the k quantity of matrices in the training data 250 may provide a one-to-one relationship between the content of a document and either an attribute of the document or an external factor. Training the neural network 300 based on the training data 250 may enable the neural network 300 to detect relationships that may exist between various combinations of content (e.g., clauses, terms, line items, and/or the like), attributes (e.g., transaction, entity, industry, commodity, region, date, and/or the like), and/or external factors (e.g., current events, market data, government rules and/or regulations, and/or the like).

For example, the convolution layer 310 may be configured to process the k quantity of matrices in the training data 250 in overlapping groups of two or more matrices. To further illustrate, FIG. 3 shows that the convolution layer 310 may process the k quantity of matrices in groups where each group may include at least one matrix that is also included in one or more other groups. The quantity of matrices that overlap between successive groups of matrices may correspond to a stride of the neural network 300. For example, each group of matrices may include a g quantity of matrices. Thus, to process the k quantity of matrices, the convolution layer 310 may process an (n-g-1) quantity of groups of matrices where each group includes a g quantity of matrices.

Referring again to FIG. 3, the convolution layer 310 may process the k quantity of matrices in overlapping groups of two or more matrices. Accordingly, the first matrix 260A and the second matrix 260B may be processed together in a first matrix group 360A. The second matrix 260B may also be processed along with the third matrix 260C in a second matrix group 360B. Alternatively and/or additionally, the third matrix 260C and the fourth matrix 260D may be processed together in a third matrix group 360C. It should be appreciated that the convolution layer 310 may process the k quantity of matrices in overlapping groups that includes a different quantity of matrices than shown. Moreover, the quantity matrices that overlap between successive group of matrices (e.g., the stride of the neural network 300) may also be different than shown.

In some example embodiments, the convolution layer 310 may process the k quantity of matrices and generate a plurality of convoluted matrices by at least applying one or more kernels to each overlapping group of matrices including, for example, the first matrix group 360A, the second matrix group 360B, and/or the third matrix group 360C. For example, the convolution layer 210 may apply a j quantity of different kernels (e.g., the kernels $K_1, K_2, \ldots, K_j$) to each overlapping group of two or more matrices. As shown in FIG. 3, the convolution layer 210 may apply the kernel $K_1$ to at least the first matrix group 360A, the second matrix group 360B, and the third matrix group 360C. Similarly, the convolution layer 210 may also apply the kernel $K_2$ to at least the first matrix group 360A, the second matrix group 360B, and the third matrix group 360C.

Each of the j number of kernels include a weight matrix and a bias. The weight matrix may include a group of weights configured to detect the presence of a certain combination of content, attribute, and/or external factors across different matrices within a group of matrices (e.g., the first matrix group 360A, the second matrix group 360B, the third matrix group 360C, and/or the like). Thus, applying a kernel to a group of two or more matrices may include computing a dot product between the kernel and the two or more matrices. Furthermore, applying the kernel to the group of two or more matrices may include adding the bias to the dot product between the kernel and the two or more matrices.

In some example embodiments, application of a kernel may enable the identification of a certain combination of content, attributes, and/or external factors within the k quantity of matrices. These combinations of content, attribute, and/or external factors may populate the plurality of convoluted matrices including, for example, a first convoluted matrix 370A, a second convoluted matrix 370B, and/or a third convoluted matrix 370C. For instance, as shown in FIG. 3, applying the kernel $K_1$ to the first matrix group 360A may identify certain combinations of content, attributes, and/or external factors within the first matrix group 360A. Application of the kernel $K_1$ to the first matrix group 360A may output the first convoluted matrix 370A, which may include the combinations of content, attributes, and/or external factors identified via the application of the kernel $K_1$ to the first matrix group 360A. Similarly, applying the kernel $K_2$ to the second matrix group 360B may identify certain combinations of content, attributes, and/or external factors within the second matrix group 360B. The second convoluted matrix 370B may include these combinations of content, attributes, and/or external factors output by the kernel $K_2$.

To further illustrate, Equation (1) below expresses the application of generation of a convoluted matrix M by applying a kernel $K_j$:

$$M = W_j X + B_j, \qquad (1)$$

wherein X may refer to an overlapping groups of matrices (e.g., the first matrix group 360A, the second matrix group 360B, the third matrix group 360C, and/or the like), wherein $W_j$ may denote a weight matrix of the kernel $K_j$, and $B_j$ may denote a bias applied by the kernel $K_j$.

In some example embodiments, the convoluted matrices generated by the convolution layer 310 (e.g., the first convoluted matrix 370A, the second convoluted matrix 370B, the third convoluted matrix 370C, and/or the like) may be further processed by the pooling layer 320. The pooling layer 320 may be configured to identify a maximum combination of content, attributes, and/or external factors from across the convoluted matrices generated by the convolution layer 310. For instance, the pooling layer 320 may identify this maximum combination of content, attributes, and/or external factors by at least applying, to each of convoluted matrix, a maximum pooling function expressed by Equation (2) below:

$$f'_{i, i \in [0,1,\ldots,j]} = \max_{k, k \in [0, 1, \ldots, n]} f_{i,j}, \qquad (2)$$

wherein f may denotes a value prior to application of the maximum pooling function, and wherein f' may denote a value that has been subject to the maximum pooling function.

The maximum combination of content, attributes, and/or external factors identified by the pooling layer 320 may be further processed by the dense layer 330, which may be a fully connected layer. Meanwhile, the output from the dense layer 330 may be further processed by the dropout layer 340. In some example embodiments, the dropout layer 340 may be configured to drop out, for example, randomly, at least a portion (e.g., half) of the output from the dense layer 330 in order to remove sampling noise introduced by the preceding layers of the neural network 300 (e.g., the convolution layer 310, the pooling layer 320, and/or the like) and/or prevent overfitting at the subsequent activation layer 350.

In some example embodiments, the activation layer 350 may generate the output 380 of the neural network 300 by at least applying one or more activation functions to the output from the dropout layer 340. For instance, the activation layer 250 may apply, to the output from the dropout layer 240, a rectifier or ramp function expressed by Equation (3) below.

$$f(x)=\max(0, x), \quad (3)$$

wherein x may denote the output from the dropout layer 340, which may also be the input into the activation layer 350.

According to some example embodiments, an output 380 of the neural network 300 may include one or more combinations of content (e.g., clauses, terms, line items, and/or the like), attributes (e.g., transaction, entity, industry, commodity, region, date, and/or the like), and/or external factors (e.g., current events, market data, government rules and/or regulations, and/or the like). Meanwhile, the editing engine 110 may provide, based on this output 380, a content recommendation. That is, these combinations of content, attribute, and/or external factors generated by the neural network 300 may form the basis of the content recommendations generated by the editing engine 110. For example, the output 380 may include a combination that includes the oil and gas industry, the supplier "Acme Co.," and a force majeure clause. Based on this combination, the editing engine 110 may provide, to the first client 140A, a recommendation to include a force majeure clause in the first document 145A where the first document 145A is associated with oil and gas industry and the supplier "Acme Co."

Meanwhile, training the neural network 300 may include adjusting the weights and/or biases that are associated with each kernel (e.g., the kernels $K_1, K_2, \ldots, K_j$) in the neural network 300 such that the neural network 300 is able to identify certain combinations of content, attribute, and/or external factors. For example, the weights and/or the biases associated with $K_1$ may adjusted such that the output 380 of the neural network 300 includes the combination oil and gas industry, the supplier "Acme Co.," and a force majeure clause. In some example embodiments, the neural network 300 may be trained using any supervised and/or unsupervised learning techniques. For example, training the neural network 300 may include processing, using the neural network 300, the training data 250. The weights and/or the biases associated with the kernels in the neural network 300 may be adjusted, for example, through backward propagation of errors and gradient descent, in order to minimize an error in the output 380 relative to a correct output associated with the training data 250. It should be appreciated that the correct output associated with the training data 250 may include combinations of content, attributes, and/or external factors that should have been included in the output 380 based on the k quantity of matrices included in the training data 250.

Figure 1B:
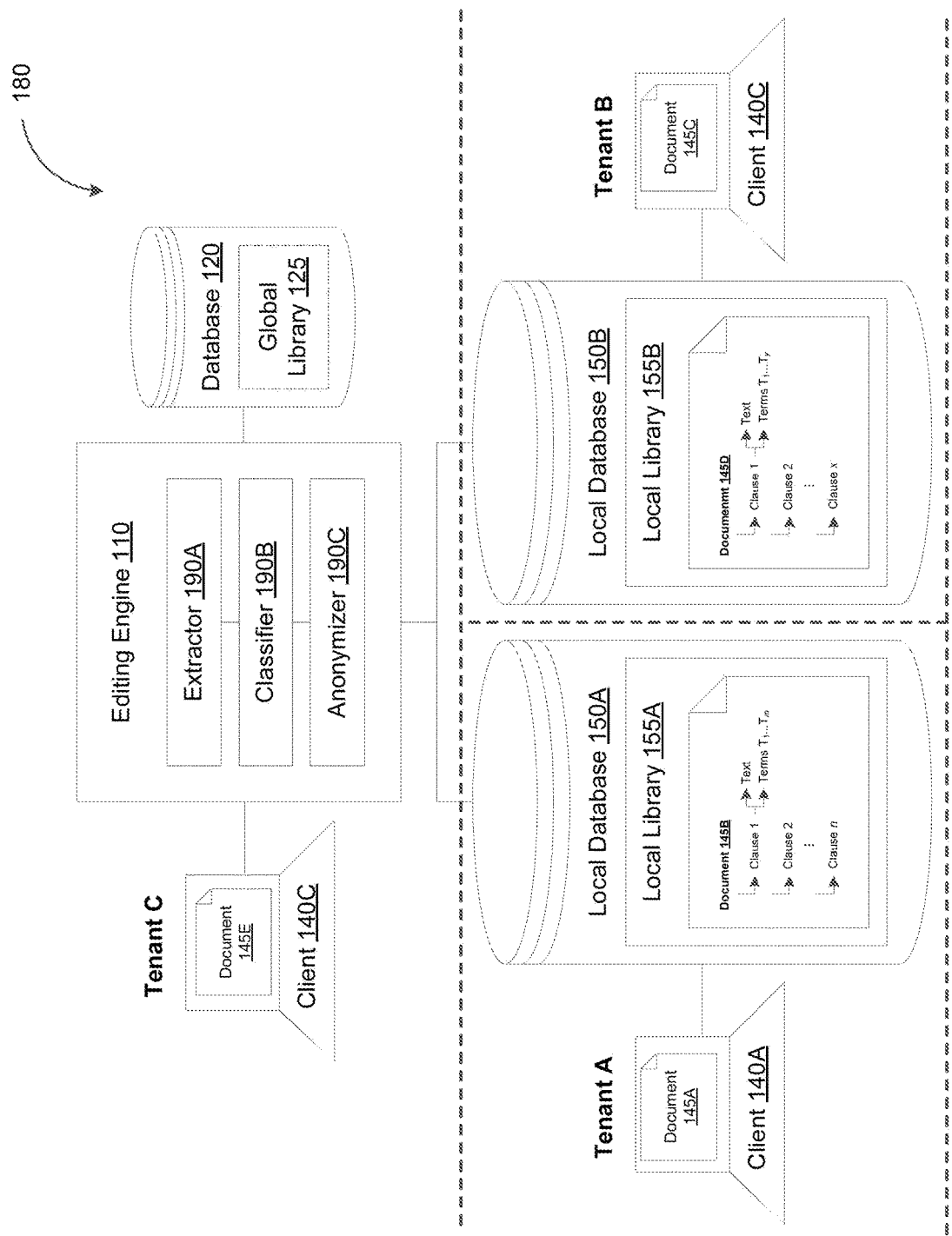
FIG. 1B depicts a system diagram illustrating a multi-tenant environment, in accordance with some example embodiments.

As noted, in some example embodiments, the editing engine 110 may be configured to support multitenancy such that the editing engine 110 may provide content recommendations to multiple tenants within a multitenant environment. To further illustrate, FIG. 1B depicts a multitenant environment 180, in accordance with some example embodiments. Referring to FIGS. 1A-B, the multitenant tenant environment 180 may be occupied by a plurality of tenants including, for example, a Tenant A associated with the first client 140A, a Tenant B associated with the second client 140B, and Tenant C associated with the third client 140C.

Referring again to FIG. 1B, the editing engine 110 may be configured to isolate and/or segregate data from different tenants within the multitenant environment 180. For example, as shown in FIG. 1B, Tenant A may maintain a first local database 150A storing a first local library 155A that includes the second document 145B. Meanwhile, Tenant B may also maintain a second local database 150B storing a second local library 155B that includes a fourth document 145, which may be an existing document associated with the second client 140C. The first local database 150A and/or the second local database 150B may be any type of database including, for example, a relational database, a non-structured query language (NoSQL) database, an in-memory database, a graph database, and/or the like.

According to some example embodiments, the first client 140A associated with Tenant A may access the first local database 150A but not the second local database 150B associated with Tenant B. Likewise, the second client 140B associated with Tenant B may access the second local database 150B but not the first local database 150A. Furthermore, the third client 140C associated with Tenant C may access neither the first local database 150A nor the second local database 150B.

In the multitenant environment 190, tenants may be prevented from sharing data stored in each tenant's respective local database. Thus, the editing engine 110 may provide content recommendations to a tenant based on data held in the local library of that tenant but not data held in the local library of other tenants. For example, in some example embodiments, the editing engine 110 may use at least a portion of the data held in the local library of a tenant to train the machine learning model 115 such that the machine learning model 115 is able to recognize correlations between the attributes of a document (e.g., transaction, entity, industry, commodity, region, date, and/or the like), one or more external factors (e.g., current events, market data, government rules and/or regulations, and/or the like), and the content of the document (e.g., clauses, terms, line items, and/or the like). In doing so, the machine learning model 115 may further be able to identify content (e.g., clauses, terms, line items, and/or the like) that should be included and/or excluded from the document based on various attributes of the document. The editing engine 110 may provide, during the creation of the document and/or prior to the execution of the document, corresponding recommendations to include and/or exclude the content (e.g., clauses, terms, line items, and/or the like) from the document.

To further illustrate, FIG. 1B shows that the editing engine 110 may provide, to the first client 140A associated with Tenant A, content recommendations for the first document 145A based on the content of the second document B held in the first local library 155A of Tenant A but not the content of the fourth document 145D held in the second local library 155B of Tenant B. Likewise, the editing engine 110 may provide, to the second client 140B, content recommendations for a third document 145C based on the content of the fourth document 145D held in the second local library 155B of Tenant B but not the second document 145B held in the first local library 155A of Tenant A. Furthermore, when providing content recommendations to the third client 140C associated with Tenant C, the editing engine 110 may use neither the second document 145B held in the first local library 155A of Tenant A nor the fourth document 145D held in the second local library 155B of Tenant B. This prohibition against the sharing of data amongst different tenants within the multitenant environment 180 may prevent the editing engine 110 from providing adequate content recommendations to Tenant A, Tenant B, and/or Tenant C. Notably, where Tenant C may lack a local library of existing documents, the editing engine 110 may be unable to provide content recommendations to the third client 140C associated with Tenant C.

As such, in some example embodiments, the editing engine 110 may support an anonymized sharing of data between different tenants within the multitenant environment 180. For instance, the editing engine 110 may extract at least a portion of the data stored in the local library of the one or more tenants in the multitenant environment 180. The extracted data may be classified and anonymized before being stored in a global library 125. Furthermore, the editing engine 110 may use the anonymized data stored in the global library 125 to generate content recommendations for any tenant within the multitenant environment 180. It should be appreciated that the anonymized sharing of data may be an opt-in feature for the tenants of the multitenant environment 180. Moreover, each tenant may be able to configure to level of anonymization applied on proprietary data before the data may be shared with other tenants in the multitenant environment 180.

Referring again to FIG. 1B, the editing engine 110 may include an extractor 190A, which may be configured to extract data from the local libraries of one or more tenants within the multitenant environment 180. For example, the extractor 190A may extract, from the first local library 155A of Tenant A, content from the second document 145B including, for example, clauses, terms, and/or line-items appearing in the second document 145B. Alternatively and/or additionally, the extractor 190B may also extract, from the second local library 155B of Tenant B, content from the fourth document 145D including, for example, clauses, terms, and/or line-items appearing in the fourth document 145B. It should be appreciated that the extractor 190A may extract data from the local libraries by at least querying the corresponding databases, for example, via one or more structured query language (SQL) statements. For instance, the extractor 190A may retrieve, from the first local library 155A, content from the second document 145B by at least querying the first local database 150A. Similarly, the extractor 190A may also retrieve, from the second local library 155B, content from the fourth document 145D by at least querying the second local database 150B.

In some example embodiments, the editing engine 110 may include a classifier 190B. The classifier 190B may be configured to classify the data extracted by the extractor 190 including, for example, the content from the second document 145B and/or the content from the fourth document 145D. The classification of the extracted data may include identifying the type of content. For instance, clauses from the second document 145B and/or the fourth document 145D may be tagged, for example, as a compensation clause, a warranty clause, a confidentiality clause, a dispute resolution clause, an ethics clause, a force majeure clause, a governing law clause, a choice of language clause, a damages clause, an indemnification clause, and/or the like. Alternatively and/or additionally, terms from the second document 145B and/or the fourth document 145D may be tagged, for example, as a pricing term, a time term, and/or the like. It should be appreciated that the classification may be performed using any technique. For example, the classifier 190B may apply one or more machine learning models (e.g., neural networks) to classify the content from the second document 145B and/or the fourth document 145D.

In some example embodiments, the editing engine 110 may further include an anonymizer 190C configured to anonymize the data extracted by the extractor 190. The anonymization of data may include the removal of personally identifiable and/or confidential information. For example, the anonymizer 190C may anonymize content from the second document 145B by at least removing personally identifiable information and/or confidential information associated with Tenant A. Alternatively and/or additionally, the anonymization of data may include abstracting the data extracted by the extractor 190, which may include replacing the specific information included in the extracted data with more generic information. As noted, each tenant may be able to configure the level of anonymization imposed on proprietary data. Here, the level of anonymization may be configured by at least adjusting the degree of abstraction applied to the proprietary data.

For example, the extractor 190A may extract content from the second document 145B that includes a line item with the Universal Product Code (UPC) of a particular product. The anonymizer 190C may abstract this data by at least replacing the actual value of the Universal Product Code (e.g., "1234567890") with a description of the information being conveyed (e.g. "Universal Product Code") and/or the corresponding data type (e.g., "numeric value," "integer," and/or the like). Alternatively and/or additionally, the anonymizer 190C may abstract the actual name of an entity (e.g., "Acme Co.") included in a clause from the second document 145B with a description of the information being conveyed (e.g., "Supplier Name") and/or the corresponding data type (e.g., "string").

In some example embodiments, a tenant may configure the level of anonymization applied on proprietary data by at least adjusting the abstraction of the data. For instance, Tenant A may increase the level of anonymization applied on data extracted from the first local library 155A (e.g., content from the second document 145B) by selecting to replace the extracted data with more generic information. In the case of the Universal Product Code, Tenant A may select to replace the actual value of the Universal Product Code included in a line item in the second document 145A with the corresponding data type (e.g., "numeric value," "integer," and/or the like), which may be more generic than a description of the information being conveyed (e.g., "Universal Product Code"). Alternatively and/or additionally, Tenant A may decrease the level of anonymization applied on the extracted data by selecting the replace the extracted data with more specific information. For example, Tenant A may select to replace the actual name of an entity (e.g., "Acme Co.") included in a clause from the second document 145B with a description of the information being conveyed (e.g., "Supplier Name"), which may be more specific than a mere identification of the data type (e.g., "string").

In some example embodiments, the editing engine 110 may be configured to provide content recommendations based on at least a portion of the anonymized data stored in the global library 125. For example, the third client 140C associated with Tenant C may be creating and/or executing a fifth document 145E associated with Tenant C. The editing engine 110 may identify, based on at least a portion of the anonymized data stored in the global library 125, content (e.g., clauses, terms, line items, and/or the like) that should be included in and/or excluded from the fifth document 145E. As noted, the anonymized data stored in the global library 125 may include content (e.g., clauses, terms, line items, and/or the like) from the second document 145B associated with Tenant A and/or the fourth document 145D associated with Tenant B. Accordingly, the editing engine 110 may provide recommendations to include and/or exclude, from the fifth document 145E associated with Tenant C, content that is present in and/or absent from the second document 145B associated with Tenant A and/or the fourth document 145D associated with Tenant B.

For example, in some example embodiments, the editing engine 110 may provide, to the third client 140C, recommendations to include and/or exclude a clause, a term, and/or a line item from the fifth document 145E if the same clause, term, and/or line item is also included in and/or excluded from the second document 145B and/or the fourth document 145D. The content recommendations may include anonymized data corresponding to the clause, term, and/or line item. For instance, the editing engine 110 may recommend the inclusion of a clause by at least providing, to the third client 140C, at least a portion of the text corresponding to the clause. The text provided as part of the content recommendation may have been anonymized, for example, to remove personally identifiable information and/or confidential informational, and/or to replace specific information with more generic information. Alternatively and/or additionally, the editing engine 110 may recommend the inclusion of a clause by providing, to the third client 140C, an indication of the classification assigned to the clause, for example, by the classifier 190B (e.g., compensation, warranty, confidentiality, dispute resolution, ethics, force majeure, governing law, choice of language, damages, indemnification, and/or the like).

Figure 4A:
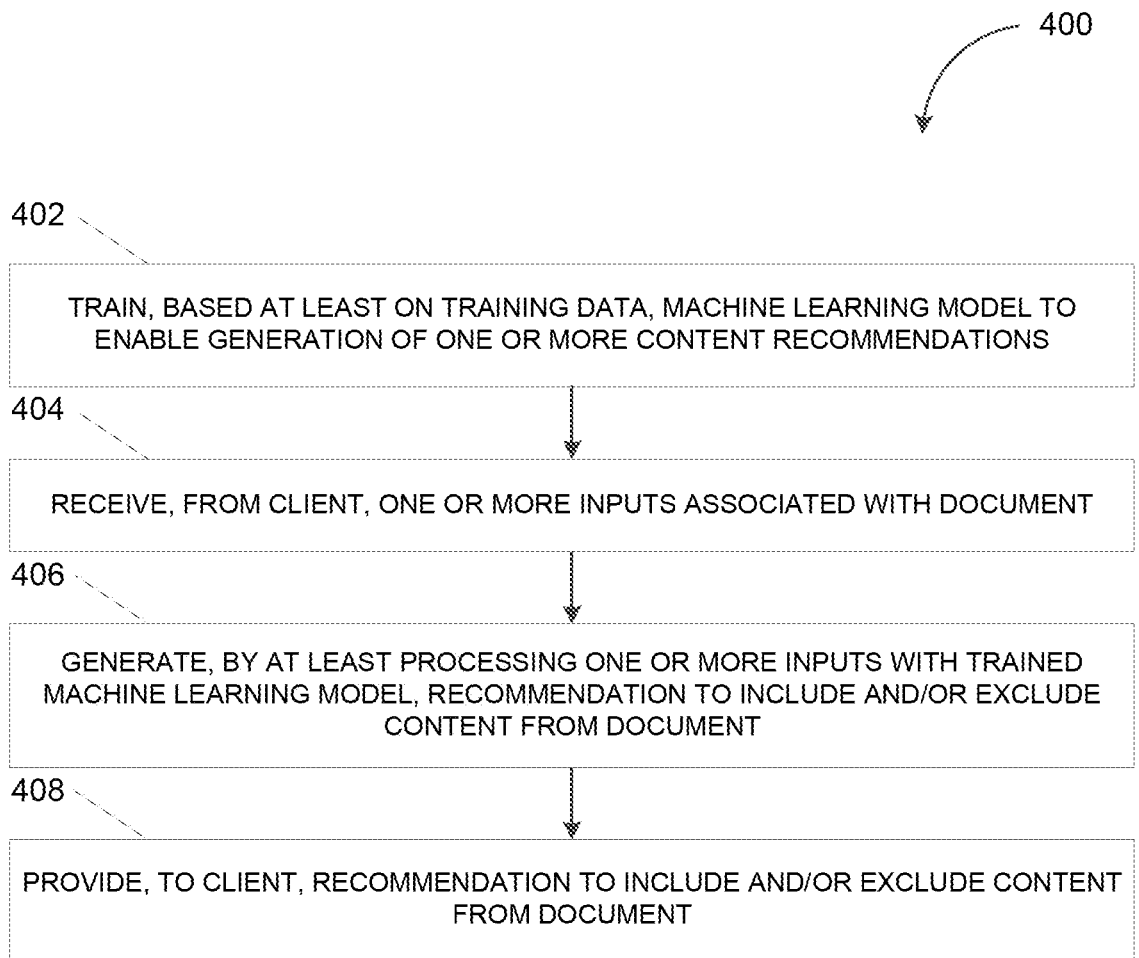
FIG. 4A depicts a flowchart illustrating a process for content recommendations, in accordance with some example embodiments.

FIG. 4A depicts a flowchart illustrating a process 400 for content recommendations, in accordance with some example embodiments. Referring to FIGS. 1A, 2A-B, and 3-4A, the process 400 may be performed by the editing engine 110.

At 402, the editing engine 110 may train, based at least on training data, the machine learning model 115 to enable a generation of one or more content recommendations. For example, the editing engine 110 may train, based at least on the training data 250, the machine learning model 115. As noted, the training data 250 may include a k quantity of matrices including, for example, the first matrix 260A, the second matrix 260B, the third matrix 260C, the fourth matrix 260D, and/or the like. For example, one or more of the k quantity of matrices included in the training data 250 may include mappings between the content of a document (e.g., a clause, a term, a line item, and/or the like) and an attribute of the document (e.g., transaction, entity, industry, commodity, region, date, and/or the like). Alternatively and/or additionally, one or more of the k quantity of matrices included in the training data 250 may include mappings between the external factors from the external intelligence 175 (e.g., current events, market data, government rules and regulations, and/or the like) and the contents of a document (e.g., a clause, a term, a line item, and/or the like).

In some example embodiments, training the machine learning model 115 using the training data 250 may enable the machine learning model 115 to recognize more complex relationships between the attributes of a document, one or more external factors, and the content of the document. For example, the machine learning model 115 may be trained to identify one or more combinations of content, attributes, and external factors representative of an underlying relationship. These combinations of content, attribute, and/or external factors may form the basis of the content recommendations generated by the editing engine 110. For example, the machine learning model 115 may be trained to identify a combination that includes the oil and gas industry, the supplier "Acme Co.," and a force majeure clause such that the editing engine 110 may provide, to the first client 140A, a recommendation to include a force majeure clause in the first document 145A where the first document 145A is associated with oil and gas industry and the supplier "Acme Co." As noted, the machine learning model 115 may be trained in any manner including, for example, by adjusting the weights and/or biases applied by the underlying neural network 300 to minimize an error in the combinations of content, attributes, and/or external factors identified by the machine learning model 115.

At 404, the editing engine 110 may receive, from a client, one or more inputs associated with a document. For example, the first client 140A may be in the process of creating the first document 145A. As such, the editing engine 110 may receive, from the first client 140A, one or more inputs corresponding to a portion of the first document 145A including, for example, the transaction $T_1$, entity $E_1$, industry $I_1$, commodity $C_1$, region $R_1$, and/or date $D_1$ associated with the first document 145A. The editing engine 110 may also receive, from the first client 140A, one or more inputs corresponding to the addition and/or deletion of a clause from the first document 145A including, for example, a compensation clause, a warranty clause, a confidentiality clause, a dispute resolution clause, an ethics clause, a force majeure clause, a governing law clause, a choice of language clause, a damages clause, and/or an indemnification clause. Alternatively and/or additionally, the first client 140A may be executing the first document 145A. Here, the one or more inputs received from the first client 140A may be the first document 145A in its entirety.

At 406, the editing engine 110 may generate, by at least processing the one or more inputs with the trained machine learning model 115, a recommendation to include and/or exclude content from the document. At 408, the editing engine 110 may provide, to the client, the recommendation to include and/or exclude content from the document. As noted, the machine learning model 115 may be trained to recognize complex relationships between the content of a document (e.g., clauses, terms, line items, and/or the like), the attributes of the document (e.g., transaction, entity, industry, commodity, region, date, and/or the like), and external factors (e.g., current events, market data, government rules and/or regulations, and/or the like). For example, the machine learning model 115 may be trained to identify one or more clauses, terms, and/or line items that may be relevant to the transaction $T_1$, entity $E_1$, industry $I_1$, commodity $C_1$, region $R_1$, and/or date $D_1$ associated with the first document 145A. Alternatively and/or additionally, the machine learning model 115 may be trained to identify additional clauses, terms, and/or line items that may be relevant to the existing clauses, terms, and/or line items in the first document 145A.

Figure 4B:
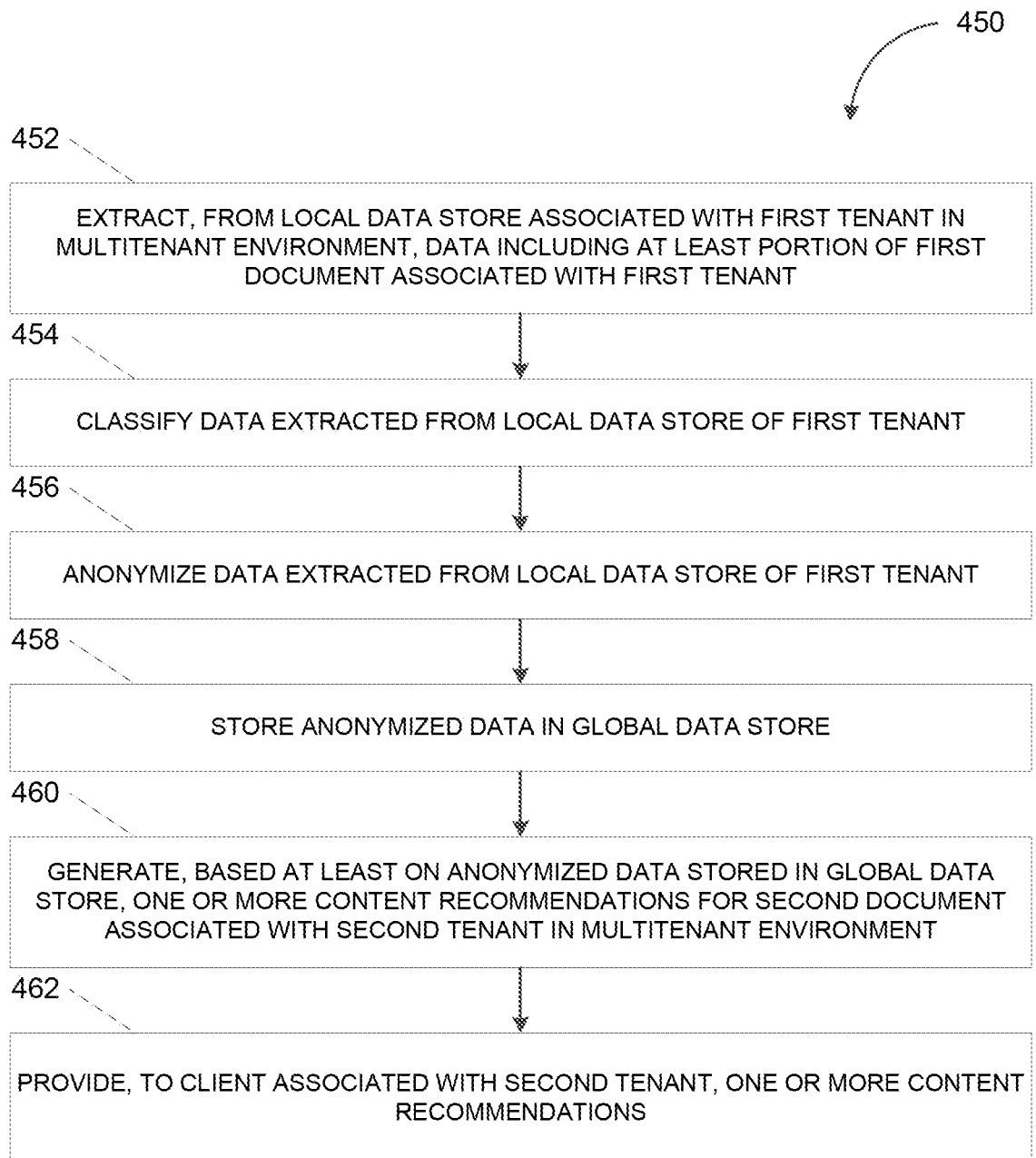
FIG. 4B depicts a flowchart illustrating a process for content recommendations, in accordance with some example embodiments.

FIG. 4B depicts a flowchart illustrating a process 450 for content recommendations, in accordance with some example embodiments. Referring to FIG. 4B, the process 450 may be performed by the editing engine 110, for example, within the multitenant environment 180.

At 452, the editing engine 110 may extract, from a local data store associated with a first tenant in a multitenant environment, data including a first content from a first document associated with the first tenant. In some example embodiments, the editing engine 110 may be configured to isolate and/or segregate data from different tenants within, for example, the multitenant environment 180. For example, as shown in FIG. 1B, Tenant A may maintain the first local database 150A whereas Tenant B may maintain the second local database 150B. Within the multitenant environment 180, Tenant A, Tenant B, and Tenant C may be prevented from directly sharing the data (e.g., the second document 145B, the fourth document 145D, and/or the like) stored in each tenant's respective local database. Instead, according to some example embodiments, the editing engine 110 may support an anonymized sharing of data between different tenants within the multitenant environment 180.

For example, referring to FIG. 1B, the extractor 190A may extract, from the first local library 155A of Tenant A, content from the second document 145B including, for example, clauses, terms, and/or line-items appearing in the second document 145B. Alternatively and/or additionally, the extractor 190B may also extract, from the second local library 155B of Tenant B, content from the fourth document 145D including, for example, clauses, terms, and/or line-items appearing in the fourth document 145B.

At 454, the editing engine 110 may classify the data extracted from the local data store of the first tenant. For example, in some example embodiments, the editing engine 110 may classify the data extracted from the first local library 155A associated with Tenant A (e.g., the content from the second document 145B) and/or the data extracted from the second local library 155B associated with Tenant B (e.g., the content from the fourth document 145D). The classification of the extracted data may include identifying the type of content. For instance, clauses from the second document 145B and/or the fourth document 145D may be tagged, for example, as a compensation clause, a warranty clause, a confidentiality clause, a dispute resolution clause, an ethics clause, a force majeure clause, a governing law clause, a choice of language clause, a damages clause, an indemnification clause, and/or the like. Alternatively and/or additionally, terms from the second document 145B and/or the fourth document 145D may be tagged, for example, as a pricing term, a time term, and/or the like.

At 456, the editing engine 110 may anonymize the data extracted from the local data store of the first client. In some example embodiments, the editing engine 110 may anonymize the data extracted from the first local library 155A (e.g., the content from the second document 145B) and/or the data extracted from the second local library 155B (e.g., the content from the fourth document 145D) by at least removing personally identifiable information and/or confidential information. Alternatively and/or additionally, the anonymization of data may include abstracting the data extracted by the extractor 190, which may include replacing the specific information included in the extracted data with more generic information. It should be appreciated that the level of anonymization may be configured by at least adjusting the degree of abstraction applied to the proprietary data. For example, Tenant A may increase the level of anonymization applied on data extracted from the first local library 155A (e.g., content from the second document 145B) by selecting to replace the extracted data with more generic information. By contrast, Tenant A may decrease the level of anonymization applied on the extracted data by selecting the replace the extracted data with more specific information.

At 458, the editing engine 110 may store the anonymized data in a global data store associated with the editing engine 110. For example, as shown in FIG. 1B, the editing engine 110 may store anonymized data in the global database 120, for example, in the global library 125.

At 460, the editing engine 110 may generate, based at least on the anonymized data stored in the global data store, one or more content recommendations for a second document associated with a second tenant in the multitenant environment. At 462, the editing engine 110 may provide, to a client associated with the second tenant, the one or more content recommendations. For example, the third client 140C associated with Tenant C may be creating and/or executing a fifth document 145E associated with Tenant C. The editing engine 110 may identify, based on at least a portion of the anonymized data stored in the global library 125, content (e.g., clauses, terms, line items, and/or the like) that should be included in and/or excluded from the fifth document 145E. The anonymized data stored in the global library 125 may include content (e.g., clauses, terms, line items, and/or the like) from the second document 145B associated with Tenant A and/or the fourth document 145D associated with Tenant B. As such, the editing engine 110 may provide recommendations to include and/or exclude, from the fifth document 145E associated with Tenant C, content that is present in and/or absent from the second document 145B associated with Tenant A and/or the fourth document 145D associated with Tenant B.

In some example embodiments, the editing engine 110 may provide content recommendations based on the output of the trained machine learning model 115. For instance, machine learning model 115 may identify a correlation between the oil and gas industry, the supplier "Acme Co.," and a force majeure clause. Accordingly, the editing engine 110 may provide, to the first client 140A, a recommendation to include a force majeure clause in the first document 145A where the first document 145A is associated with oil and gas industry and the supplier "Acme Co."

Figure 5:
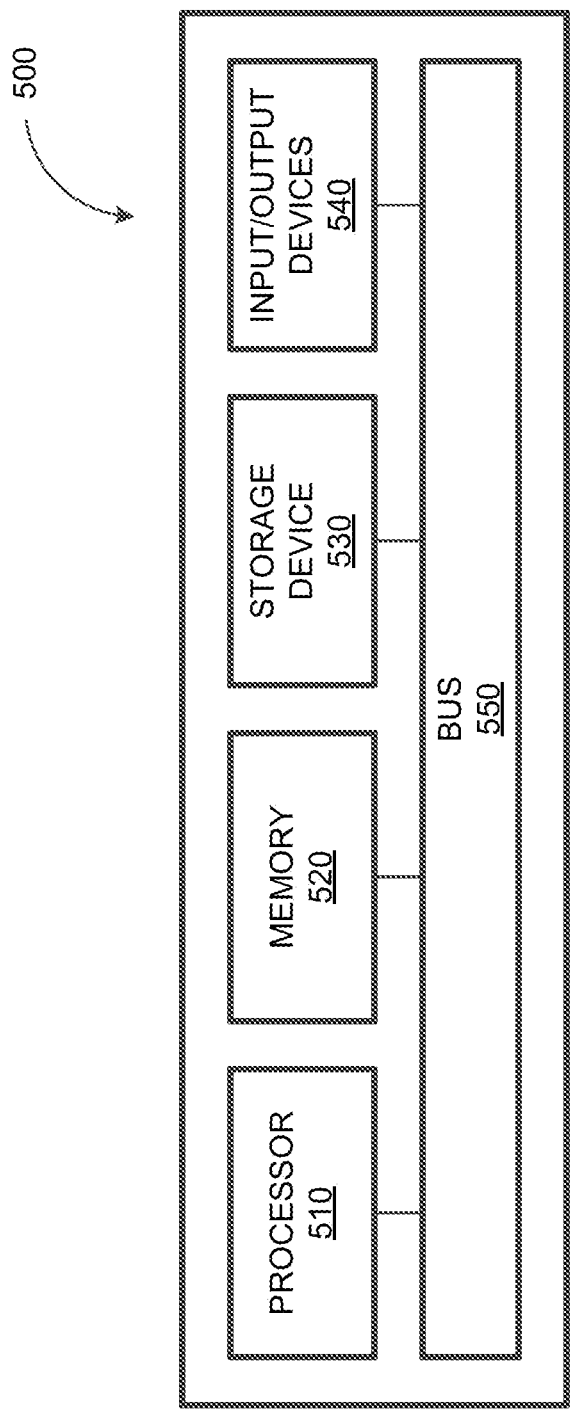
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the editing engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the editing engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions which, when executed by the at least one data processor, result in operations comprising:
training a machine learning model by at least processing, with the machine learning model, training data including a first matrix corresponding to a first attribute and a second matrix corresponding to a second attribute, the first matrix including one or more values indicating whether one or more contract clauses are present in a document having the first attribute, the second matrix including one or more values indicating whether the one or more contract clauses are present in a document having the second attribute, and the machine learning model being trained, based at least on the first matrix and the second matrix, to identify one or more correlations between the first attribute, the second attribute, and a presence of the one or more contract clauses;
receiving, from a client, one or more inputs associated with a first document;
generating, by at least processing the one or more inputs with the trained machine learning model, a recommendation to include a first contract clause from the first document, the trained machine learning model generating the recommendation based at least on the first contract clause being included in a second document having one or more attributes and/or content in common with the first document; and
providing, to the client, the recommendation to exclude the first contract clause from the first document.

2. The system of claim 1, wherein the one or more inputs includes an attribute associated with the first document and/or a second contract clause included in the first document.

3. The system of claim 2, wherein the first contract clause and/or the second contract clause comprise structured data.

4. The system of claim 1, wherein the training data further includes a third matrix including one or more values indicating whether each of the one or more contract clauses are present given one or more external factors.

5. The system of claim 4, wherein the one or more external factors include a current event, a market data, and/or a government regulation.

6. The system of claim 4, wherein the machine learning model is trained to identify at least one correlation between the second contract clause included in the second document, the second document having the first attribute and/or the second attribute, and/or the external factor.

7. The system of claim 6, wherein the machine learning model includes at least one kernel, wherein the at least one kernel is associated with one or more weights and biases, and wherein the at least one kernel is configured to identify the at least one correlation by at least applying the one or more weights and biases to the first matrix and/or the second matrix.

8. The system of claim 7, wherein the training of the machine learning model comprises adjusting the one or more weights and/or biases associated with the at least one kernel, and wherein the one or more weights and/or biases are adjusted to at least minimize an error in the identification of the at least one correlation between the second contract clause included in the second document, the attribute of the second document, and/or the external factor.

9. The system of claim 8, wherein the adjustment of the one or more weights and/or biases comprises a backward propagation of errors and/or gradient descent.

10. The system of claim 1, wherein the machine learning model comprises a regression model, an instance-based model, a regularization model, a decision tree, a Bayesian model, a clustering model, an associative model, a neural network, a deep learning model, a dimensionality reduction model, and/or an ensemble model.

11. A computer-implemented method, comprising:
training a machine learning model by at least processing, with the machine learning model, training data including a first matrix corresponding to a first attribute and a second matrix corresponding to a second attribute, the first matrix including one or more values indicating whether one or more contract clauses are present in a document having the first attribute, the second matrix including one or more values indicating whether the one or more contract clauses are present in a document having the second attribute, and the machine learning model being trained, based at least on the first matrix and the second matrix, to identify one or more correlations between the first attribute, the second attribute, and a presence of the one or more contract clauses;
receiving, from a client, one or more inputs associated with a first document;
generating, by at least processing the one or more inputs with the trained machine learning model, a recommendation to include a first contract clause from the first document, the trained machine learning model generating the recommendation based at least on the first contract clause being included in a second document having one or more attributes and/or content in common with the first document; and
providing, to the client, the recommendation to exclude the first contract clause from the first document.

12. The computer-implemented method of claim 11, wherein the one or more inputs includes an attribute associated with the first document and/or a second contract clause included in the first document.

13. The computer-implemented method of claim 12, wherein the first contract clause and/or the second contract clause comprise structured data.

14. The computer-implemented method of claim 11, wherein the training data further includes a third matrix including one or more values indicating whether each of the one or more contract clauses are present and/or absent given one or more external factors.

15. The computer-implemented method of claim 14, wherein the one or more external factors include a current event, a market data, and/or a government regulation.

16. The computer-implemented method of claim 14, wherein the machine learning model is trained to identify at least one correlation between the second contract clause included in the second document, the second document having the first attribute and/or the second attribute, and/or the external factor.

17. The computer-implemented method of claim 16, wherein the machine learning model includes at least one kernel, wherein the at least one kernel is associated with one or more weights and biases, and wherein the at least one kernel is configured to identify the at least one correlation by at least applying the one or more weights and biases to the first matrix and/or the second matrix.

18. The computer-implemented method of claim 17, wherein the training of the machine learning model comprises adjusting the one or more weights and/or biases associated with the at least one kernel, and wherein the one or more weights and/or biases are adjusted to at least minimize an error in the identification of the at least one correlation between the second contract clause included in the second document, the attribute of the second document, and/or the external factor.

19. The computer-implemented method of claim 18, wherein the adjustment of the one or more weights and/or biases comprises a backward propagation of errors and/or gradient descent.

20. A non-transitory computer readable medium storing instructions, which when executed by at least one data processor, result in operations comprising:
  training a machine learning model by at least processing, with the machine learning model, training data including a first matrix corresponding to a first attribute and a second matrix corresponding to a second attribute, the first matrix including one or more values indicating whether one or more contract clauses are present in a document having the first attribute, the second matrix including one or more values indicating whether the one or more contract clauses are present in a document having the second attribute, and the machine learning model being trained, based at least on the first matrix and the second matrix, to identify one or more correlations between the first attribute, the second attribute, and a presence of the one or more contract clauses;
  receiving, from a client, one or more inputs associated with a first document;
  generating, by at least processing the one or more inputs with the trained machine learning model, a recommendation to include a first contract clause from the first document, the trained machine learning model generating the recommendation based at least on the first contract clause being included in a second document having one or more attributes and/or content in common with the first document; and
  providing, to the client, the recommendation to exclude the first contract clause from the first document.

\* \* \* \* \*